June 30, 1942.    H. S. OGDEN    2,288,415
CONTROL SYSTEM
Filed April 3, 1941
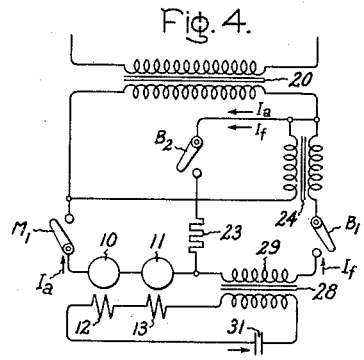
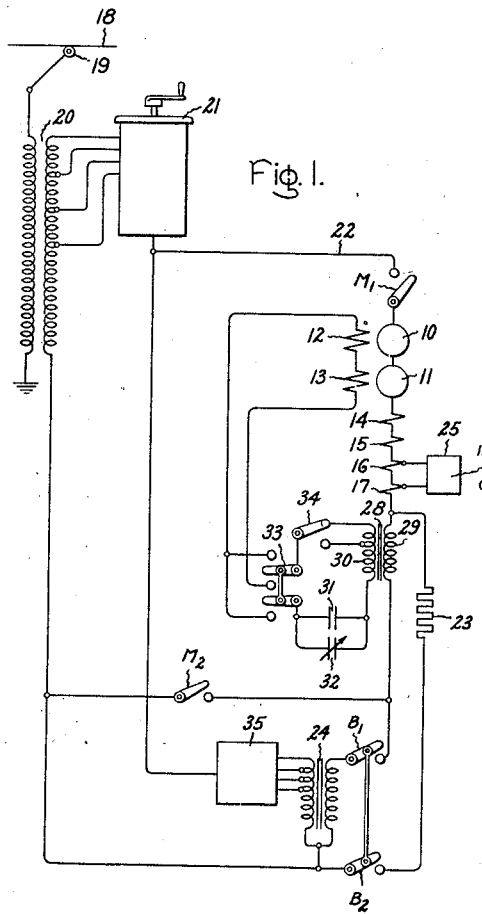
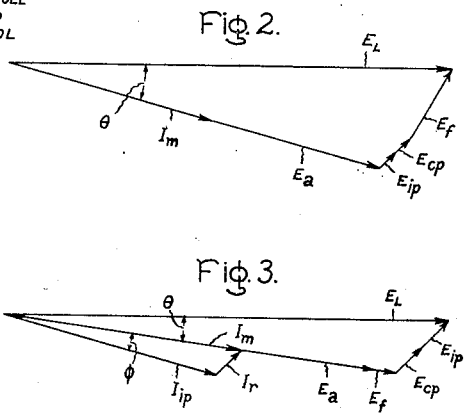
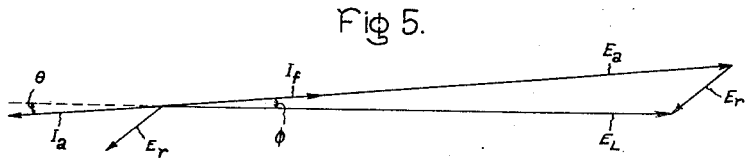
Inventor:
Harold S. Ogden,
by Harry E. Dunham
His Attorney.

Patented June 30, 1942

2,288,415

UNITED STATES PATENT OFFICE 2,288,415

CONTROL SYSTEM

Harold S. Ogden, Erie, Pa., assignor to General Electric Company, a corporation of New York Application April 3, 1941, Serial No. 386,684

8 Claims. (Cl. 172—179)

My invention relates to control systems and particularly to systems for controlling single phase alternating current series motors for accelerating and regenerative braking operation.

The principal object of my invention is to provide practical and efficient means for regeneratively braking an alternating current series motor.

A further object of my invention is to provide means for improving the power factor of single phase series motors during accelerating and regenerative braking operation.

It is a further object of my invention to provide new and improved means for weakening the motor field during the motor starting period.

It is a still further object of my invention to provide a compact and inexpensive control system by reducing the necessary physical size and electrical capacity of the apparatus necessary for the control of an alternating current series motor.

In carrying out my invention in one form I connect the field winding of a single phase alternating current motor across the secondary winding of a field transformer, the primary winding of which is connected directly in series with the armature circuit of the motor. In series with field winding I also connect a certain amount of capacitance by means of which the voltage drop across the primary winding of the field transformer may be adjusted to be in phase with the motor current. A field exciting transformer separately energized from the line voltage is provided for exciting the motor fields during regenerative braking operation. Under both motoring and regenerating conditions the capacitance connected in the field circuit has the effect of appreciably increasing the power factor of the motor.

My invention itself will be better understood and its objects and advantages further appreciated by referring now to the following detailed specification taken in connection with the accompanying drawing in which Fig. 1 is a schematic circuit diagram of connections for a control system embodying my invention; Figs. 2 and 3 are vector diagrams representing respectively the current and voltage relations during motoring operation of a conventional single phase series motor and a motor connected in accordance with my invention; Fig. 4 is a simplified circuit diagram of connections for regenerative braking operation; and Fig. 5 is a vector diagram representing the current and voltage relations during regenerative braking operation of a motor connected in accordance with my invention.

Referring now to Fig. 1, I have shown my invention in one form as applied to a pair of single phase alternating current motors 10 and 11 having, respectively, main field windings 12 and 13, compensating windings 14 and 15, and interpole windings 16 and 17. It will be obvious of course that a plurality of motors may be substituted for either or both of the motors, if desired, without departing from the spirit and scope of my invention. The motors 10 and 11 are energized from a single phase source of alternating current supply 18 through a trolley 19 and a power transformer 20. By means of a suitable manually operated controller 21, which may be a drum controller, a supply conductor 22 leading to one side of the motor circuit may be connected to a selected tap of suitable voltage on the secondary winding of the transformer 20 to control the speed of the motors. For motoring operation, the motors 10 and 11 are connected in series across the secondary winding of the power transformer 20 through a pair of motoring switches $M_1$ and $M_2$. For regenerative braking operation the armatures of the motors 10 and 11 are connected in series across the secondary winding of the power transformer 20 through the motoring switch $M_1$, a stabilizing resistor 23 and a braking switch $B_2$, while an exciting voltage of line frequency is impressed upon the field windings 12 and 13 of the motors through a field exciting transformer 24 and the braking switches $B_1$ and $B_2$.

At 25 I have indicated an interpole field control device which may be of a type well known to those skilled in the art. Preferably, however, the interpole field circuit comprises a divided interpole field winding for each motor having one portion of each winding shunted by a capacitor, as is fully shown and described and claimed in my copending application Ser. No. 388,874, filed April 16, 1941, patented Feb. 24, 1942, No. 2,274,378.

The field windings 12 and 13 are energized through a field current transformer 28 having a primary winding 29 connected in series with the armature circuit of the traction motors 10 and 11. The secondary winding 30 of the field transformer 28 is connected across a field circuit comprising the field windings 12 and 13 in series with a parallel connected group of condensers 31 and 32. For purposes of illustration, I have shown a condenser 31 of fixed capacity connected in parallel with a condenser 32 of variable capacity, both condensers being connected in series with the field windings 12 and 13. It will, of course, be understood by those skilled in the art that any desired number or arrangement of fixed or variable capacitors may be utilized to obtain the desired capacitance as will be more fully pointed out hereinafter.

For controlling the energization of the field windings 12 and 13 I have shown a field reversing switch 33 and a tap changing switch 34. The tap changing switch 34 is associated with the secondary winding 30 of the field transformer 28 to control the degree of energization of the field windings 12 and 13. The switch 34 may be used to weaken the motor fields during starting or high speed running, thereby eliminating the auto-transformer and main field shunts now used in many installations.

For motoring operation the motoring switches M1 and M2 are closed and the field reversing switch 33 is operated to connect the field windings 12 and 13 for energization in a desired direction. In a manner which is well understood connections are completed within the interpole field control unit 25 to connect the non-inductive resistor in shunt to the interpole field windings 16 and 17. For weak field starting the tap changing switch 34 may be first connected to a low current tap and later connected to the high current tap of the field transformer 28.

To connect the motors 10 and 11 for regenerative braking the switch M1 is left closed, the switch M2 is opened, and the braking switches B1 and B2 are both closed. A simplified diagram of the regenerative braking connections is shown in Fig. 4. From that figure it will be observed that the armatures of the motors 10 and 11 are connected across the secondary winding of the power transformer 20 through the stabilizing resistor 23, while a voltage of line frequency is impressed upon the field windings 12 and 13 through the field transformer 28 by the field exciting transformer 24. The field exciting circuit comprises the secondary winding of the transformer 24, the primary winding 29 of the transformer 28, and the stabilizing resistor 23. The primary winding of the field exciting transformer 24 is connected across the secondary winding of the power transformer 20. As shown at Fig. 1, I preferably provide a tap changing means 35 connected between the power transformer 20 and the primary winding of the field exciting transformer 24 for the purpose of controlling the voltage applied to the field exciting transformer.

I wish to have it understood that, while I have shown the switches M1, M2, B1, B2, 33 and 34 as manually operated, these switches, as well as the interpole control unit 25, may be remotely controlled from a single manually operated drum controller in a manner which is well known to those skilled in the art.

The stabilizing resistor 23 has the effect of reducing the voltage applied to the series winding 29 of the field transformer 28 by the field exciting transformer 24, and also tends to maintain constant the voltage generated by the armatures of the motors 10 and 11. At Fig. 4 I have indicated the direction of the field and armature currents $I_f$ and $I_a$ respectively. It will be observed that the field and armature currents flow in the same direction through the stabilizing resistor 23. Since the stabilizing resistor 23 is in both the field exciting and armature circuits, an increased voltage drop across this resistor resulting from an increased armature current will decrease the voltage applied to the field transformer 28 and thereby diminish the energization of the field windings 12 and 13. The resulting decrease in field flux has the effect of reducing the voltage generated by the motor armatures and thus decreasing the armature current. Since the field current established by the field exciting transformer is in the same direction as the armature current during motoring operation, the field windings 12 and 13 need not be reversed for braking operation.

Referring now to Fig. 2, I have shown a vector diagram of the voltage and current relations existing in a single phase alternating current series motor having its field winding connected directly in circuit with its armature. The voltage across the armature of the motor $E_a$ may be represented as in phase with the motor current $I_m$, since it is due almost entirely to the generated voltage, which is in phase with the field flux and consequently the field current. The balance or reactance voltage of the armature may be considered as a part of the voltage $E_{cp}$ of the compensating windings. The voltage across the interpole field winding $E_{ip}$ leads the line current $I_m$ by slightly less than 90°. The voltage across the main field winding $E_f$ leads the motor current $I_m$ by substantially ninety degrees because of the predominance of inductance in the main field winding. The voltages $E_a$, $E_{ip}$, $E_{cp}$ and $E_f$ add vectorially to equal the line voltage $E_L$. The power factor of such a motor may be represented by the expression cosine $\theta$, where $\theta$ is the angle between $E_L$ and $I_m$.

The power factor of a single phase series motor may be greatly improved by means of my invention. Referring now to Fig. 1, if the capacitors 31 and 32 are so adjusted that the voltage drop across the field windings 12 and 13 is just equal to the voltage drop across the capacitors 31 and 32, a condition of series resonance will result in which the resultant voltage drop across the secondary winding 30 of the field transformer 28 is only that necessary to overcome the very slight resistance of the field windings 12 and 13. Stated in another way, this means that the capacitive reactance of the capacitors 31 and 32 is substantially equal to the inductive reactance of the field windings 12 and 13. Under these conditions the resultant voltage drop across the field circuit will be relatively small and will be in phase with the motor current $I_m$. At Fig. 3 I have shown a vector diagram of voltage and current relations existing in a single phase alternating current motor equipped with capacitors according to my invention. Vector quantities and angles corresponding to those of Fig. 2 have been assigned like reference numerals. It will be observed from Fig. 3 that when the voltages $E_a$, $E_f$ and $E_{ip}$ and $E_{cp}$ are added vectorially to equal the line voltage $E_L$, the angle $\theta$ has been greatly reduced because of the fact that the voltage $E_f$ across the main field windings is now in phase with the motor current and is of considerably smaller magnitudes.

The regenerative braking operation of an alternating current series motor having its field and armature windings connected directly in series and with the conventional balancing resistor (but without a phase correction of the main field) is entirely impractical, due to the wide displacement of the line voltage and field current. Since the armature voltage is in phase with the field current the resultant voltage which must be added to the armature voltage to equal the line voltage is very large and widely displaced from the line voltage, such a motor will not regenerate when a stabilizing resistor of conventional size is used.

According to my invention the regeneration of an A. C. series motor becomes practical and possible by adjusting the series capacitors 31 and 32 to substantially fully compensate for the inductive voltage drop across the field windings 12 and 13. If desired, the power factor may be even further improved by adjusting the capacitors to overcompensate for the inductive voltage drop so that the field current will lead the applied voltage by a small angle. This condition is represented by the vector diagram of Fig. 5. In Fig. 5 the field current $I_f$ is shown leading the applied voltage $E_L$ by a small angle $\varphi$. The generated voltage $E_a$ is in phase with the field current $I_f$ and is greater than the applied voltage $E_L$. The resultant voltage $E_r$ forces through the armature circuit a lagging current $I_a$ which is substantially one hundred and eighty degrees out of phase with the field current $I_f$. By proper adjustment of the voltage of the armature circuit the armature current $I_a$ may be made to fall exactly one hundred and eighty degrees out of phase with the field current $I_f$, thereby improving the power factor of the motor and reducing to a minimum the deleterious effect on motor commutation of having the field and armature currents out of phase. As shown at Fig. 5, the armature current $I_a$ and the applied voltage $E_L$ differ in phase by an angle $\theta$. Therefore the power factor of the motor represented by the vector diagram of Fig. 5 is equal to the cosine of $\theta$.

From the preceding detailed description numerous advantages of my invention will be immediately apparent to those versed in the art. For example, by using the field transformer 28 the field circuits are insulated from the armature circuits and means are provided for stepping down the field current and stepping up the field voltage to such a point that the size of the capacitors 31 and 32 may be reduced to a minimum. This is desirable because, while the conventional traction motor series field operates on high current, a saving in size of capacitors may be effected by using relatively low current at a higher voltage. Furthermore, the variable voltage tap on the secondary winding of the field transformer 28 supplants the auto-transformer and main field shunts which are now commonly employed in connection with alternating current series motors to obtain weak field starting. The field transformer 28 itself is not an expensive piece of apparatus, since it need have only sufficient capacity to supply the in-phase drop in the main field circuit. Since this resistive voltage drop in the field circuit is relatively small, the field transformer 28 need be of only relative field capacity. A further advantage of my invention is that during motoring operation that portion of the main transformer voltage required for exciting the traction motor fields is equal only to the in-phase voltage drop in the field circuit. With the voltage drop across the field windings thus reduced by the capacitors 31 and 32, an appreciably lower maximum transformer voltage may be provided at the power transformer 20. The power transformer 20 therefore may itself be reduced in size for an installation of any given capacity.

The most important advantage of my invention, of course, is its provision for a practical and efficient scheme for regeneration. It will be apparent, that, where electric vehicles embodying my invention predominate on a system, advantage may be taken of the high power factor by increasing the spacing of sub-stations.

While I have shown a particular embodiment of my invention by way of example, many other modifications will undoubtedly occur to those skilled in the art, and I, therefore, wish to have it understood that I intend in the appended claims to cover all such modifications as fall within the true spirit and scope of my invention.

What I claim as new and desire to secure by Letters Patent of the United States, is:

1. In a system of control for a single phase alternating current traction motor having an armature and a field winding, a capacitor connected in series with said field winding, first switching means for connecting said motor to a source of alternating current supply for motoring operation, a stabilizing resistor, second switching means for connecting said armature to said source of alternating current supply in series with said stabilizing resistor thereby to establish a regenerative braking circuit, and transformer means arranged to energize said field winding in series with said capacitor and said stabilizing resistor during regenerative braking operation.

2. In a system of control for a single phase alternating current traction motor having an armature and an inductive field winding, a transformer for energizing said field winding comprising a primary winding connected in series with said armature and a secondary winding having at least two terminals, a capacitor connected in series with said field winding thereby to constitute a field circuit for said motor, said capacitor having a reactance substantially equal to the reactance of said field winding, means for connecting said field circuit to two terminals of said secondary winding, and switching means for connecting said armature and said primary winding to a source of alternating current supply.

3. In a system of control for a single phase alternating current traction motor having an armature and a field winding, transformer means for energizing said field winding comprising a primary winding connected in series with said armature and a secondary winding provided with variable voltage taps, a capacitor connected in series with said field winding thereby to constitute a field circuit for said motor, a reversing switch for reversing the connection of said field winding in said field circuit, means for connecting said field circuit to selectable taps on said secondary winding, and switching means for connecting said armature and said primary winding to a source of alternating current supply.

4. In a regenerative braking system for a single phase alternating current motor having an armature and a field winding, a capacitor connected in series with said field winding, a stabilizing resistor, means for establishing a regenerative braking circuit comprising said armature and said resistor connected in series across a source of alternating current supply, means for establishing a field exciting circuit including said stabilizing resistor, and a field exciting transformer energized from said source of alternating current supply and connected to impress upon said field circuit a voltage of supply frequency.

5. In a regenerative braking system for a single phase alternating current traction motor having an armature and a field winding, a capacitor permanently connected in series with said field winding, a stabilizing resistor, first switching means for connecting said armature and said resistor in series across a source of alternating current supply thereby to establish a regenerative braking circuit, field exciting means comprising a field transformer having a primary winding and a secondary winding connected to energize said field winding in series with said capacitor, second switching means for establishing a field exciting circuit including said stabilizing resistor and said primary winding connected in series, and a field exciting transformer for impressing upon said field exciting circuit a voltage of supply frequency, said field exciting transformer comprising a secondary winding connected in said field exciting circuit and a primary winding connected across the terminals of said source of alternating current supply.

6. In a system of control for a single phase alternating current traction motor having an armature and a field winding, a capacitor permanently connected in series with said field winding, means for reversing the connection of said field winding, a field transformer for exciting said field winding comprising a primary winding connected in series with said armature and a secondary winding connected across said field winding and said capacitor, first switching means for connecting said armature and said primary winding in series across the terminals of a source of alternating current supply thereby to accelerate said motor, second switching means for establishing a regenerative braking circuit for said motor including said armature and a stabilizing resistor, means for establishing a field exciting circuit including said primary winding and said stabilizing resistor, and a field exciting transformer having a secondary winding connected to impress upon said field exciting circuit a voltage of supply frequency and a primary winding connected across the terminals of said source of alternating current supply.

7. In a system of control for a single phase alternating current traction motor having an armature and an inductive field winding, a variable capacitor permanently connected in series with said field winding, said capacitor having a reactance substantially equal to the reactance of said field winding, a field transformer for exciting said field winding comprising a primary winding permanently connected in series with said armature and a secondary winding provided with a plurality of variable voltage taps, means for selectably connecting said field winding and said capacitor to said voltage taps, means for reversing the connection of said field winding with respect to said secondary winding, first switching means for connecting said armature and said primary winding in series across the terminals of a source of alternating current supply thereby to accelerate said motor, a stabilizing resistor, second switching means for establishing a regenerative braking circuit for said motor including said armature and said stabilizing resistor in series, third switching means for establishing a field exciting circuit including said primary winding and said stabilizing resistor in series, and a field exciting transformer having a secondary winding connected to impress upon said field exciting circuit a voltage of supply frequency, and a primary winding provided with a plurality of taps selectably connectable across the terminals of said source of alternating current supply, whereby the power factor of said motor is improved during both motoring and regenerating operation by substantial electrical series resonance between said capacitor and said field winding.

8. In a motor control system the combination of a single phase alternating current motor having an armature and an inductive field winding, said field winding being connected for energization continuously during operation of said motor in response to the total current passing through said armature, means for improving the power factor of said motor consisting of a capacitor connected in series circuit relation with said field winding and also arranged for energization continuously during operation of said motor in response to the total current passing through said armature, said capacitor having a capacitive reactance substantially equal to the inductive reactance of said field winding so that said capacitor and said field winding are substantially in electrical series resonance, and switching means for connecting said motor to a source of alternating current supply.

HAROLD S. OGDEN.